United States Patent [19]

Oestreich

[11] Patent Number: 4,822,132
[45] Date of Patent: Apr. 18, 1989

[54] OPTICAL COMMUNICATIONS CABLE

[75] Inventor: Ulrich Oestreich, Munich, Fed. Rep. of Germany

[73] Assignee: Siemens Aktiengesellschaft, Berlin and Munich, Fed. Rep. of Germany

[21] Appl. No.: 110,878

[22] Filed: Oct. 21, 1987

[30] Foreign Application Priority Data

Mar. 2, 1987 [DE] Fed. Rep. of Germany ....... 3706677

[51] Int. Cl.$^4$ .............................................. G02B 6/44
[52] U.S. Cl. .................................................. 350/96.23
[58] Field of Search ...................................... 350/96.23

[56] References Cited

U.S. PATENT DOCUMENTS

| | | | |
|---|---|---|---|
| 3,825,336 | 7/1974 | Reynolds | 350/96.24 X |
| 3,922,645 | 11/1975 | Camp et al. | 350/96.24 X |
| 4,237,550 | 12/1980 | Steensma | 350/96.23 X |
| 4,468,088 | 8/1984 | van der Hoek | 350/96.23 |
| 4,550,976 | 11/1985 | Cooper et al. | 350/96.23 |

FOREIGN PATENT DOCUMENTS 3200760 7/1983 Fed. Rep. of Germany .
2528220 12/1983 France ............................ 350/96.23

OTHER PUBLICATIONS

Haag et al., "Proceedings of the 30th International Wire and Cable Symposium", Cherry Hill, N.J., U.S.A., Nov. 17–19, 1981, pp. 259–269.

Primary Examiner—John D. Lee
Attorney, Agent, or Firm—Hill, Van Santen, Steadman & Simpson

[57] ABSTRACT

An optical communications cable is constructed of a plurality of separate bundles, with each containing light waveguides loosely received in a protective covering. The inner, separately disposed bundle has a greater number of light waveguides than the outwardly disposed bundles, so that branching can be produced in a very simple way with only the outwardly disposed bundles.

11 Claims, 1 Drawing Sheet

OPTICAL COMMUNICATIONS CABLE

BACKGROUND OF THE INVENTION

The present invention is directed to an optical communication cable having a plurality of separate bundles or trunk groups, with each bundle containing light waveguides which are loosely surrounded by a protective covering.

A cable having a plurality of individual bundles or trunk groups is disclosed in German Published Application No. 32 00 760. The individual bundles or trunk groups are all identically constructed and also contain the same number of light waveguides.

In the framework of local cable networks constructed with light waveguides, it is necessary to design the cables to be as branching-friendly as possible. At these branchings themselves, only a very limited number of fibers or waveguides are normally being removed from the light waveguide cable or, respectively, from the bundle union in order to be able to conduct the waveguides to the individual subscriber station. In accordance with such a network structure, a cable could, in fact, be constructed of a relatively great number of bundle leads, each containing only a few light waveguides. However, this would result in that the cable would become relatively extensive and bulky. Moreover, such a structure has the disadvantage that a relatively great number of the bundle leads laid in the starting area of the link are required only over a relatively short length and an unnecessarily great outlay thus arises given a full design of the cable for the overall length. When, by contrast, the cable is quite specifically constructed and manufactured for the respective application, then underutilized fiber links are, in fact, hardly present, but a great multiplicity of types occur.

SUMMARY OF THE INVENTION

The object of the present invention is to provide a way in which the stated demands can be met with the lowest possible outlay, namely, without having to accept all too many unexploited fibers and an undesirably great multiplicity of types.

This object is achieved in an improvement in an optical communication cable having a plurality of separate bundles, with each bundle containing light waveguides loosely enveloped in a protective covering. The improvements are that an inner, centrally disposed bundle contains a greater number of light waveguides than each of the remaining outwardly disposed bundles.

Since the inner, centrally disposed bundle has a greater number of light waveguides, it is used to bridge the greatest transmission distance, for example, it can be utilized for the greatest length of the link within the network without requiring a splicing or branching of this relatively great number of light waveguides carried therein. As relates to the branching procedure itself, it is also especially advantageous to, respectively, allow the central bundle or trunk group to continue and to use only the outwardly disposed bundles or groups for the branching because they are more easily accessible and can be separated from the overall union of the cable more easily.

The excess fiber lengths, which are the available fiber lengths, arise in the outwardly disposed bundles which are stranded around the inwardly most disposed bundle on the basis of an SZ-stranding. The fibers in the bundle lie in a helix so that the optical fibers can be pulled out or shortened. This is particularly true with the centrally disposed bundle.

Other advantages and features of the present invention will be readily apparent from the following description of the preferred embodiments, the drawings and claims.

DESCRIPTION OF THE PREFERRED EMBODIMENTS

Figure 1:
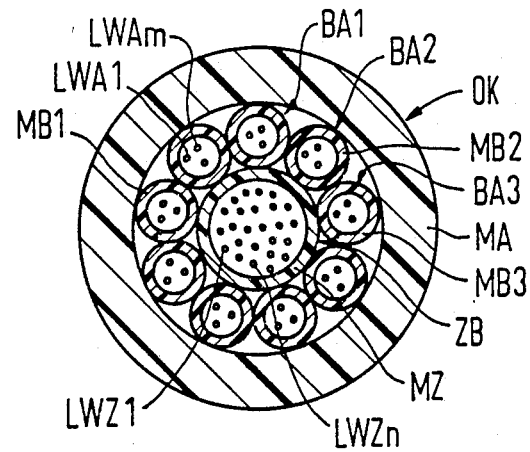
FIG. 1 is a cross sectional view through an optical cable in accordance with the present invention.

The principles of the present invention are particularly useful in an optical cable, which is generally indicated at OK in FIG. 1, and comprises a centrally disposed bundle, generally indicated at ZB, which is surrounded by a protective sheathing MZ. The centrally disposed bundle ZB is provided with a great number of light waveguides LWZ1-LWZn, which are all received within the protective sheathing or covering MZ with the remaining space of the sheath MZ being filled with a known filling compound (not shown), which will remain soft.

A series of outwardly applied bundles, of which only three are referenced as BA1, BA2 and BA3, lie around the centrally disposed bundle ZB in at least one closed ply. Each of these bundles BA1-BA3 has a plurality of light waveguides which, for example, are referenced LWA1-LWAm. The plurality or number m of these light waveguides is substantially less than the plurality or number n of the light waveguides in the centrally disposed bundle ZB. Each of the outwardly disposed bundles BA1-BA3 comprises an outer protective sheathing or covering MB1-MB3 and the inside space of each bundle BA1-BA3 can, likewise, be filled with a soft filling compound, which is not shown in the present drawings. The gores, or spaces, between the central bundle ZB and the individual bundles BA1-BA3 can also be filled by a core-filling compound.

An outside of the cable is formed by a cladding or sheath MA which is preferably applied by extrusion. In addition, strain relief elements and/or a multi-layer cladding or sheath can be provided.

It is expedient to select the diameter of the centrally disposed bundle ZB to be greater than the diameter of the outwardly disposed bundles BA1-BA3. Expediently, the diameter of the centrally disposed bundle ZB is in a range of about 2-4 times larger than the diameter of each of the outwardly disposed bundles BA1-BA3. The wall thickness of the covering or sheathing MZ of the central bundle ZB is also expediently selected to be greater than the wall thickness of each of the sheathings or coverings MB1-MB3 of the outwardly disposed bundles BA1-BA3. Preferably, the wall thickness of the sheathing MZ is between 2-4 times greater than the wall thickness of the sheathings MB1-MB3. In order to be able to use the central bundle ZB as a kind of supporting element, it can be fabricated of a harder material than the outwardly disposed bundles BA1-BA3. It is also desirable that the ratio of the wall thickness to the diameter of the outwardly disposed bundles BA1-BA3 should be selected to be substantially identical to the ratio of the wall thickness to the diameter of the central bundle ZB insofar as possible.

It is expedient to strand the outwardly disposed bundles BA1-BA3 onto the central bundle ZB and to thereby use the central bundle ZB as a core element for the stranding process. It is expedient to apply the stranding of the outwardly disposed bundles BA1-BA3 onto the stretched core formed by the central bundle ZB with an alternating twist direction so that it is applied with an SZ-stranding method. This is especially advantageous because complicated unwinding procedures can be avoided during the branching process. Part of the length required for splicing can be taken from the length created by the SZ-stranding, particularly when the spacing between the reversing locations is small enough in order to fit into the full length of a slicing cable sleeve or muff.

It is expedient, when each of the outwardly disposed bundles BA1-BA3, as well as the central bundles ZB, are constructed so firmly, as seen in terms of the wall thickness of the respective sheathings MB1-MB3 and MZ that it can be used as a cable, which is independently laid. The respective outer protecting sheaths MB1-MB3, as well as MZ, must, thus, comprise an adequate stiffness and can, when warranted, also be constructed in a multi-layer fashion in order to meet the respective demands made of branch cable sub-elements. For example, it may be constructed of an aromatic polyamide, polyetherimide, or the like.

Figure 2:
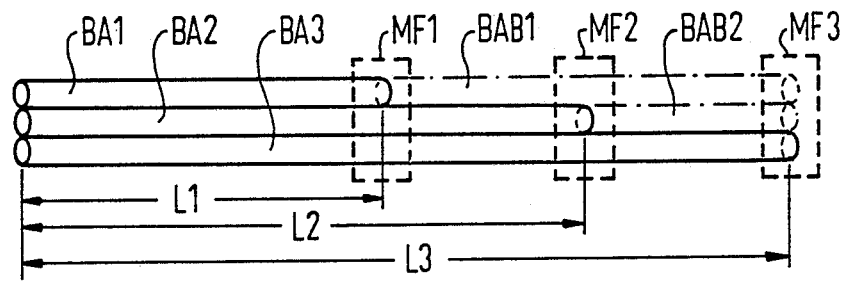
FIG. 2 is a schematic illustration of the replacement of individually outwardly disposed bundles by dummy bundle elements.

In accordance with the schematic illustration of FIG. 2, one can also proceed so that a dummy element BAB1 is inserted into the cable union after a length L1 instead of the outwardly disposed bundle BA1. This dummy element BAB1 only serves the purpose of essentially preserving the outside contour of the cable OK. The dummy element BAB1 can be composed of a less expensive and simpler material and serves the purpose of maintaining the external structure and shape of the cable format.

It is assumed in the present example that all the light waveguides of the outwardly disposed bundle BA2 are conducted to a corresponding subscriber and spliced after a length L2 so that a dummy element BAB2 can then be inserted into the cable union, since the bundle BA2 does not extend any further. Viewed overall, thus, the possibility occurs of providing the individual, outwardly disposed bundles graduated in different lengths and to replace the remainder with dummy elements as desired. In contrast thereto, the central bundle ZB, not shown in greater detail in FIG. 2, is always present over the full cable length, because no branching of the central cable ZB occurs. Rather, this is not supplied for general splicing until the next central location or station. At the end of the cable length, i.e., following the length L3, the central bundle ZB is finally conducted into a different cable type and divided, or is also directly continued by itself.

When, by contrast, other cable types are to be connected, they can occur with splicing in the region of the branching muffs MF1-MF2, which, accordingly, are only shown in broken lines.

Figure 3:
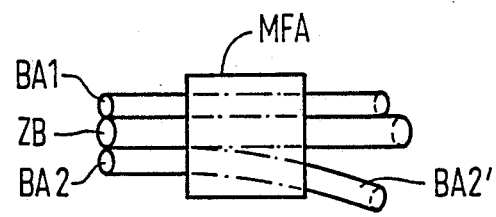
FIG. 3 is a schematic illustration of the structure of a branching location at a cable muff or sleeve.

FIG. 3 shows a schematic illustration of a branching location, wherein only two outwardly disposed bundles BA1 and BA2 are shown, in addition to the central bundle ZB, in order to simplify the illustration. This cable union has the two outwardly disposed bundles BA1 and BA2, as well as the central bundle ZB, enter into a cable muff or splicing sleeve MFA, wherein branching occurs, namely, the bundle BA2 is separated from the cable union and is continued as an individual sub-cable BA2′ which, in the present example, contains only three optical fibers, whereas the remaining elements BA1 and ZB are continued on as a remaining cable union or element. When all of the cable leads have the same length and not necessarily the same number of fibers, length graduation is not possible. A compromise between the loss due to the cutting and/or the selection of cable types must then be made at the branching. At the transition from the cable comprising k outside bundles to one comprising k−1 or k−2 outside bundles, dummy elements such as BAB1 are inserted into the second cable, for example, following the length L1 of FIG. 2 to create a format of dummy elements and active elements, instead of all active leads. Analogous cases apply at the length L2, where the next dummy element is references BAB2.

The cable described above, thus, presents a cost-beneficial, standardized solution which does justice to the many-sided demands of an optical light waveguide local network in a simple and economical fashion. The non-splicing and non-branching fibers of the central bundle ZB creates a basic structure which can be conducted through the muffs or branching locations everywhere in an especially simple way and which proceed up to the corresponding cable terminal without more splicing operations than required in terms of the possible draw-in length being required.

By contrast thereto, the outwardly disposed bundles BA1-BA3 can be branched off from the cable union in a simple way in accordance with the respective, local conditions, and can be conducted to the subscriber stations or to other branching points.

A few examples of formatting for the distribution of the light waveguides are set forth below:

Cable Type 1 has 90 fibers and an overall core diameter of 11.6 mm. Cable Type 1 contains a central bundle ZB, which has 18 fibers, an inside diameter of 3.3 mm and an outside diameter of 5.5 mm. Nine bundle elements BA1-BA9 are stranded on the central bundle ZB, and each of these bundle elements has eight fibers, an inside diameter of 1.7 mm and an outside diameter of 2.8 mm.

Cable Type 2 contains 50 light waveguides and has a core outside diameter of 11.6 mm. Cable Type 2 has a central bundle ZB containing 18 fibers, an inside diameter of 3.3 mm and an outside diameter of 5.5 mm. Four outwardly disposed bundles and five dummy elements are stranded onto the centrally disposed bundle ZB. The four outwardly disposed bundles each have eight fibers an inside diameter of 1.7 mm and an outside diameter of 2.8 mm. Each of the dummy elements, such as BAB1, BAB2, have an outside diameter of 2.8 mm.

As a result of the lower plurality of subscriber connections required to the outside, all outwardly disposed bundles in the second exemplary embodiment are no longer provided with light waveguides starting at the beginning. Rather, dummy elements are already utilized from the beginning of the cable instead of individual outwardly disposed bundles.

The latter example, which has 50 light waveguides, can also be modified so that, for example, eight outwardly disposed bundles, each having four light waveguides can be utilized, and only one dummy element is additionally employed, instead of an outwardly disposed bundle containing waveguides.

The replacement of the outwardly disposed bundles, each having eight light waveguides, for bundles, each having four light waveguides, can, for example, be undertaken in stages of four from 30 through 90 light waveguides so that the bundles comprising four light waveguides are additionally contained in addition to the outwardly disposed bundles comprising eight light waveguides. All outwardly disposed bundles, thus, need not respectively comprise the same number of light waveguides. The ratio of n:m, which is the number of light waveguides in the central bundle ZB to the number of light waveguides in each of the outwardly disposed bundles, should be expediently selected to be in a range of ratios of 4:1–1.5:1.

Although various minor modifications may be suggested by those versed in the art, it should be understood that I wish to embody within the scope of the patent granted hereon all such modifications as reasonably and properly come within the scope of my contribution to the art.

I claim:

1. In an optical communications cable comprising a plurality of separate bundles, each containing light waveguides which are loosely enveloped by a protective covering having a wall thickness, the improvements comprising an inner, centrally disposed bundle having a greater number of light waveguides than each of the remaining outwardly disposed bundles, the protective covering of said centrally disposed bundle having a diameter greater than the diameter of the protective covering of each of the outwardly disposed bundles, said centrally disposed bundle having a first ratio between the wall thickness and diameter, each of the outwardly disposed bundles having a second ratio between their wall thickness and diameter and said first and second ratios being substantially the same.

2. In an optical communications cable according to claim 1, wherein the diameter of the centrally disposed bundle is greater than the outwardly disposed bundles by a range of 2–4 times.

3. In an optical communications cable according to claim 1, wherein the wall thickness of the central bundle is greater by 2–4 times the wall thickness of the covering for each of the outwardly disposed bundles.

4. In an optical communications cable according to claim 1, wherein all of the bundles are surrounded by a common outside sheath.

5. In an optical communications cable according to claim 1, wherein the outwardly disposed bundles are stranded onto the central bundle.

6. In an optical communications cable according to claim 5, wherein the stranding is an SZ-stranding.

7. In an optical communications cable according to claim 1, wherein each of the outwardly disposed bundles are successively replaced in steps by dummy elements.

8. In an optical communications cable according to claim 1, wherein at least the centrally disposed bundle is looped to pass through a cable sleeve unspliced, and at least one of the outwardly disposed bundles is branched off at the cable sleeve.

9. In an optical communications cable according to claim 1, wherein each of the outwardly disposed bundles contains a number of waveguides in the range of between 2 and 10 waveguides, and wherein the centrally disposed bundle contains between 11 and 30 light waveguides.

10. In an optical communications cable comprising a plurality of separate bundles, each containing light waveguides loosely enveloped within a protective covering having a wall thickness, said bundles including a centrally disposed bundle with the remaining bundles being stranded on said centrally disposed bundle, and all of the bundles being received in a common outer sheath, the improvement comprising the centrally disposed bundle having a greater number of light waveguides than each of the outwardly disposed remaining bundles and the protective covering of the centrally disposed bundle having a diameter greater than the diameter of the protective covering of each of the outwardly disposed remaining bundles, said centrally disposed bundles having a first ratio between the wall thickness and diameter of the protective covering, each of the outwardly disposed remaining bundles having a second ratio between the wall thicknesses and diameters of the protective covering and said first and second ratios being substantially the same.

11. In an optical communications cable according to claim 10, wherein after a given length from one end of the cable at least one of the outwardly disposed bundles is replaced by a dummy element so that the cable has the same substantial outer diameter regardless of branching of one of the outwardly disposed bundles from said cable.

* * * * *